Figure 1:
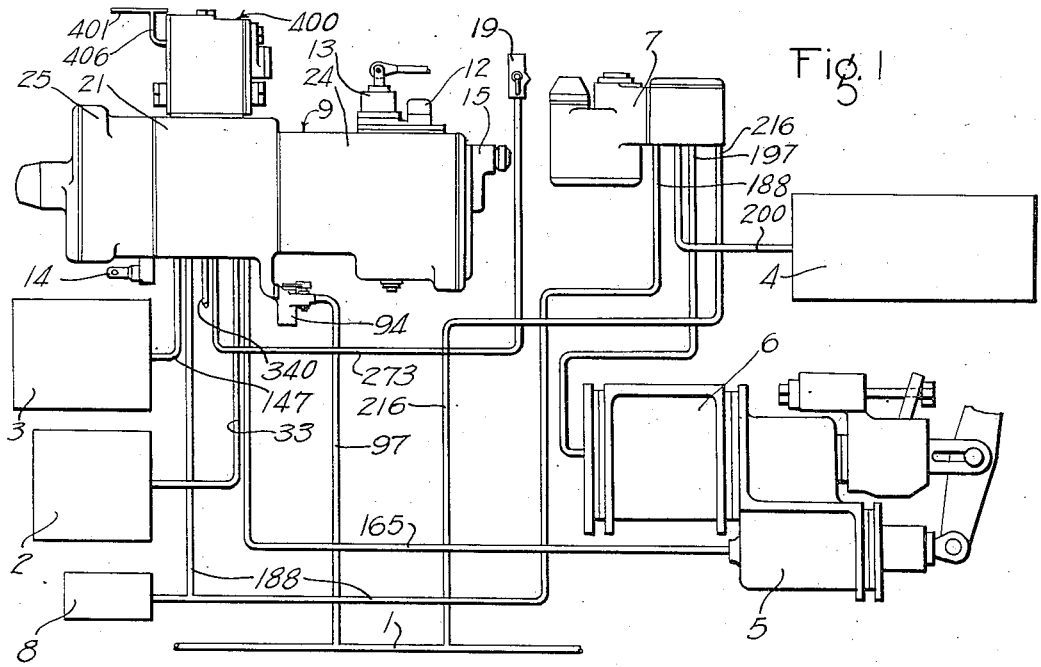

March 24, 1936.    C. C. FARMER    2,035,056
FLUID PRESSURE BRAKE
Filed Oct. 18, 1934    2 Sheets-Sheet 1

POSITION FOR PASSENGER TRAIN OPERATION.

INVENTOR
CLYDE C. FARMER.
BY Wm. M. Cady
ATTORNEY

March 24, 1936.  C. C. FARMER  2,035,056
FLUID PRESSURE BRAKE
Filed Oct. 18, 1934  2 Sheets-Sheet 2
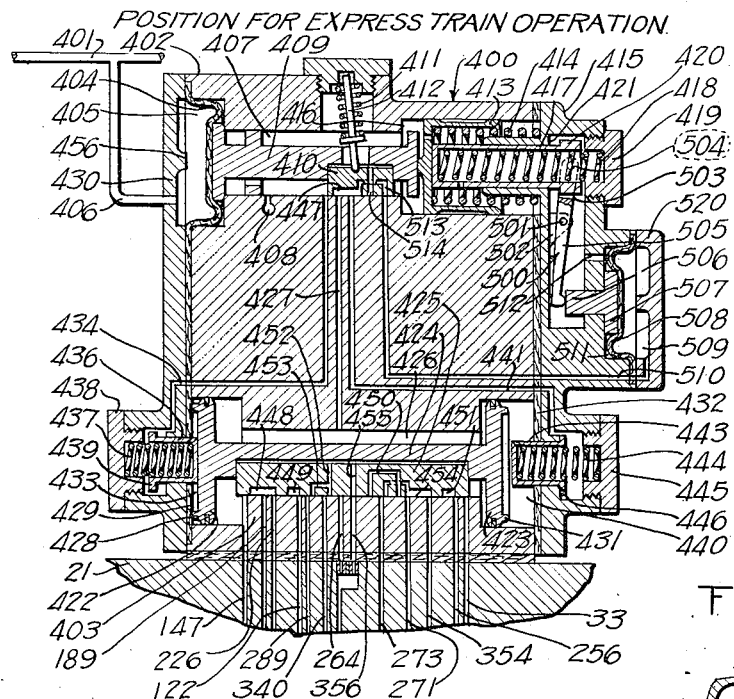
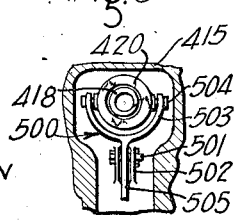
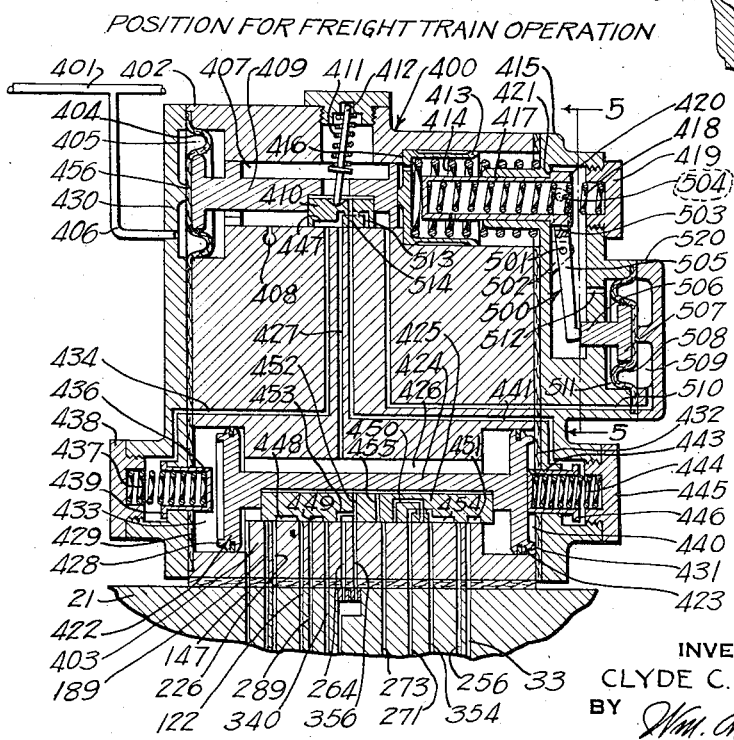
INVENTOR
CLYDE C. FARMER.
BY Wm. H. Cady
ATTORNEY Patented Mar. 24, 1936

2,035,056

UNITED STATES PATENT OFFICE 2,035,056

FLUID PRESSURE BRAKE

Clyde C. Farmer, Pittsburgh, Pa., assignor to The Westinghouse Air Brake Company, Wilmerding, Pa., a corporation of Pennsylvania Application October 18, 1934, Serial No. 748,831

24 Claims. (Cl. 303—23)

This invention relates to fluid pressure brake equipments of the type which may be readily changed over or conditioned to meet the braking requirements of one or another of a plurality of classes of railway train service, and relates more particularly to the means for changing over or conditioning the equipment to function properly in the particular service in which it is employed.

The railroad companies have provided several very important classes of train service such for instance as passenger, express and freight, and have designated and equipped certain cars for the particular service in which they are to be employed. It is well known that the fluid pressure brake requirements of the three enumerated classes of service differ from each other to such an extent, that while a fluid pressure brake equipment may be adequate for one class of service, it may be entirely inadequate for the other two classes of service. This will be understood when it is remembered that passenger trains are comparatively short and are operated on high speed schedules, that express trains are usually longer than passenger trains and are operated on speed schedules approaching passenger train schedules, and that freight trains are generally much longer than express trains and are operated on slower speed schedules.

Modern transportation requirements are such that cars equipped for one class of service may also be employed in the other classes of service, so that under normal train operating conditions it is not uncommon for a train in any particular service to include cars equipped for any other service, for instance it is not uncommon for passenger, express and freight trains to include passenger equipment cars, express cars and freight cars.

It has heretofore been the common practice to apply fluid pressure brake equipment designed for passenger service to the cars to be employed in express train service, but since, for example, passenger and express cars are sometimes included in long freight trains and the operating characteristics of passenger and freight brake equipments differ so much from each other, such equipments cannot operate in harmony with each other in the same train and therefore will not fully meet the present transportation requirements.

To meet the braking requirements of the several classes of transportation service above enumerated, a brake equipment capable of being changed over or conditioned for different classes of train service by means of a manually operative change-over valve device has been proposed by Ellis E. Hewitt and myself and made the subject of our pending joint application, Serial No. 743,546, filed September 11, 1934.

An automatically operative change-over valve device has also been proposed by Ellis E. Hewitt and myself and made the subject of our pending joint application, Serial No. 747,734, filed October 10, 1934.

The automatically operative control valve device disclosed in the last mentioned pending application, Serial No. 747,734, comprises a change-over valve portion which is movable by fluid under pressure to any one of three change-over positions, and also comprises a control valve portion subject to signal pipe pressure for controlling the positioning of the change-over valve portion. In this device, the control valve portion and consequently the change-over valve portion are adapted to be moved to their passenger train service position by a signal pipe pressure of between ten and forty-five pounds, and are adapted to be moved to their express train service position by a signal pipe pressure in excess of forty-five pounds and are further adapted to be moved to their freight train service position when the signal pipe pressure is below ten pounds.

Means are provided in the device for moving the control valve portion to its freight train service position when the signal pipe pressure is below ten pounds and other means are provided for maintaining the control valve portion in its passenger train service position when the signal pipe pressure is between ten and forty-five pounds. This last mentioned means permits the control valve portion to move to its express train service position when the signal pipe pressure is in excess of forty-five pounds and is adapted to cause the control valve device to move from its express train service position to its passenger train service position when the signal pipe pressure is reduced to forty-five pounds. From this it is obvious that if, in express train service, the signal pipe pressure should, due to leakage or otherwise, be reduced to forty-five pounds, the control valve portion and consequently the change-over valve portion will unintentionally assume their passenger service position. Since the signal pipe is charged from the front end of the train, the possibility of such a reduction is greatest on the rear portion of the train, so that while the change-over valve device on the cars at the front end of the train may be in their express train service position those on the cars at the rear end of the train may be in their passenger train service position. Under these conditions the fluid pressure brake equipments on the cars at the rear end of the train could not operate in harmony with those on the cars at the front end of the train.

An object of the invention is to provide an automatically operative change-over valve device having means whereby the above mentioned unintentional operation is prevented.

Another object of the invention is to provide a change-over valve device, of the type which is automatically movable to or from any of a plurality of controlling or conditioning positions, with means which, when the device is moved to a certain controlling or conditioning position, is adapted to prevent the unintentional return of the device from said position.

Other objects and advantages will appear in the following more detailed description of the invention.

Figure 2:
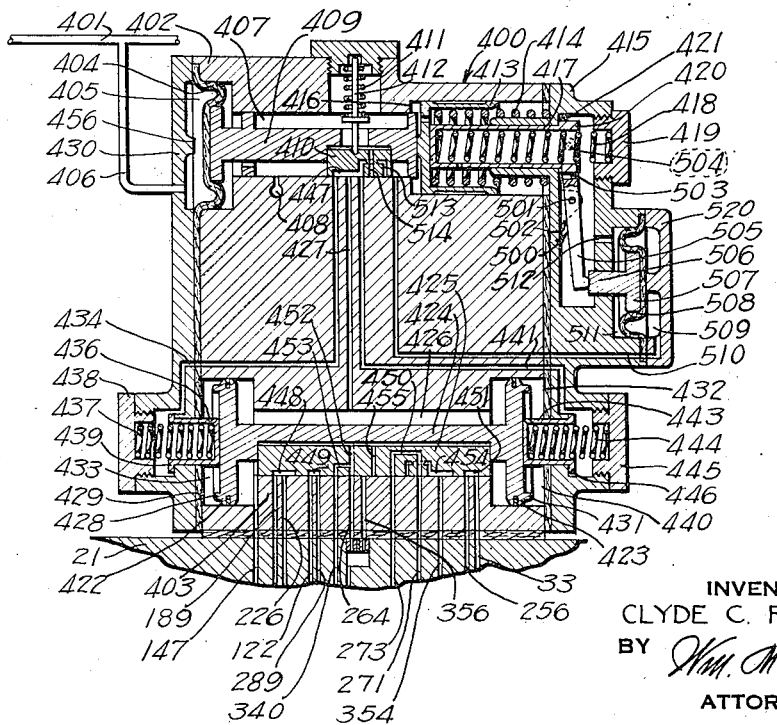

In the accompanying drawings, Fig. 1 is a diagrammatic view of a fluid pressure brake equipment embodying the invention; Fig. 2 is an enlarged diagrammatic sectional view of a change-over valve device embodying the invention, said device being in position for conditioning the fluid pressure brake equipment for passenger train service; Fig. 3 is a diagrammatic sectional view similar to that of Fig. 2, but showing the change-over valve device in position for conditioning the fluid pressure brake equipment for express train service; Fig. 4 is a diagrammatic sectional view similar to that of Fig. 2 but showing the change-over valve device in position for conditioning the fluid pressure brake equipment for freight train service and Fig. 5 is a fragmentary detail sectional view taken on the line 5—5 of Fig. 4.

In the accompanying drawings, the reference character 400 indicates a change-over valve device which with but several exceptions hereinafter fully pointed out, is similar to the change-over valve device disclosed in the aforementioned pending application, Serial No. 747,734, and which when associated with a fluid pressure brake equipment adapted to be conditioned to meet the braking requirements of any one of a plurality of classes of train service, is automatically operable to effect such conditioning.

For illustrative purposes only, the change-over valve device 400 is shown associated with a fluid pressure brake equipment which, with the exception of the change-over valve device, may be substantially identical with the equipment fully shown, described and claimed in the aforementioned pending application, Serial No. 743,546. This brake equipment is adapted to be changed over or conditioned for either passenger train service, express train service or freight train service.

Since, as just pointed out, the brake equipment, with the exception of the change-over valve device, is substantially identical with the equipment disclosed in the above mentioned pending application, Serial No. 743,546, the following detailed description will be limited more or less to the change-over valve device and its functions. However, the several other parts of the equipment will be briefly described in order to clearly bring out the cooperative relationship between the change-over valve device 400 and the remainder of the fluid pressure brake equipment.

In order to simplify the drawings and description of the present invention, the devices and parts of the present equipment which correspond to those of the equipment disclosed in the aforementioned pending application, Serial No. 743,-546, are identified by the same reference characters as used in said pending application.

Since, as hereinbefore stated, the change-over valve device is similar to the corresponding device in the aforementioned pending application, Serial No. 747,734, the parts of the present device which correspond with those of the device disclosed in said pending application are identified by the same reference characters as used in said application.

The fluid pressure brake equipment shown in Fig. 1 of the drawings comprises a brake pipe 1, an auxiliary reservoir 2, an emergency reservoir 3, a supply reservoir 4, a take-up cylinder device 5, a brake cylinder 6, a relay valve device 7, a volume reservoir 8, a brake controlling valve mechanism 9 comprising a pipe bracket 21, an equalizing valve device 24, an emergency valve device 25 and other devices not shown in the drawings, the change-over valve device 400, a quick service modifying or limiting valve device 12, a reservoir release valve device 13, a safety valve device 14, a release insuring valve device 15, a retaining valve device 19, an auxiliary reservoir pipe 33, a combined centrifugal dirt collector and cut-out cock device 94 which is connected to a pipe 97 leading from the brake pipe 1, an emergency reservoir pipe 147, a take-up cylinder pipe 165, a volume reservoir and relay piston chamber pipe 188, a brake cylinder pipe 197, a supply reservoir pipe 200, a supply reservoir charging pipe 216 leading from the brake pipe 1, a pipe 273 leading to the retaining valve device 19, a pipe 340 of a water raising system (not shown), and a signal pipe 401.

The change-over valve device 400 comprises a casing 402 and a slide valve seat 403 which, in the present embodiment of the invention, may be secured to the pipe bracket 21 in any desired manner, and also comprises a change-over valve mechanism and a control mechanism for controlling the operation of the change-over valve mechanism.

The control mechanism just referred to comprises a movable abutment in the form of a flexible diaphragm 404 having at one side a chamber 405 which is connected through a passage and pipe 406 to the signal pipe 401, and having at the other side a chamber 407 which is constantly connected to a passage 408 leading to the atmosphere. Contained in the chamber 407 is stem 409 which is operative to control the movement of a control slide valve 410 also contained in the chamber 407, said slide valve being urged against the slide valve seat by a spring 411 acting through the medium of a plunger 412.

The forward end of the stem 409 is operatively engaged by the flexible diaphragm and the rear end is adapted to be engaged by a combined actuating and stop member 413 which is slidably mounted in the casing, and which is subject to the action of a spring 414 which is interposed between and operatively engages the member and a cover plate 415 secured to one end of the casing, said spring tending, at all times, to urge the member toward a stop shoulder 416 formed on the casing and which is adapted to limit the movement of the member in the direction of the stem 409.

Slidably mounted in the cover plate 415 is a stop member 417 which is constantly subject to the pressure of a spring 418 interposed between and engaging the member and a plug 419 having screw-threaded connection with the cover plate 415, said spring, at all times, tending to urge the stop member in the direction toward the stop member 413, movement of the stop member 417 in this direction being limited by the engagement of an annular flange 420 thereof with a stop shoulder 421 formed on the cover plate 415. With the member 413 in engagement with the stop shoulder 416 and the flange 420 of the member 417 in engagement with the stop shoulder 421, the free end of the member will be spaced a short distance away from the member 413. As will hereinafter more fully appear, the spring 414 alone, acting through the medium of the member 413, yieldably resists movement of the stem 409 and slide valve 410 in a direction toward the right hand until such time as the member engages the stop member 417 after which, this spring as well as spring 418 acting through the medium of the member 417 yieldably resists movement of the stem and slide valve in this direction.

The spring 414 is of such a value that a fluid pressure of ten pounds in the diaphragm chamber 405 will, through the medium of the stem 409, maintain the member 413 in engagement with the end of the member 417. The spring 418 is of such a value that it will not yield to the action of the stem 409 unless the pressure of fluid in the chamber 405 is above forty-five pounds.

For the purpose of holding the control valve mechanism in its express train service position against its unintentional return to passenger position by the action of the spring 418 and member 417, a mechanism is provided comprising a lever 500 which is rockably mounted intermediate its ends on a pin 501 mounted in spaced lugs 502 carried by the casing. In the present embodiment of the invention, the arm 503 of the lever is forked so as to pass partially around the member 417. The ends of the tines of this forked portion of the lever are pivotally connected to the member 417 by means of trunnions 504 which may be in the form of bolts having screw-threaded connection with the member.

The arm 505 of the lever is adapted to be operatively engaged by the stem 506 of a follower member 507 which is adapted to be operatively engaged by a flexible diaphragm 508 clamped between the cover plate 415 and a cap plate 520 secured to the cover plate.

At one side of the diaphragm 508 there is a chamber 509 which is constantly connected to a passage 510 leading to the seat for the control slide valve 410 and at the other or follower side there is a chamber 511 which is open to the atmosphere by way of a passage 512, chamber 407 and passage 408.

The change-over valve mechanism comprises spaced pistons 422 and 423 which are rigidly connected together by means of a piston stem 424 which is adapted to shift a slide valve 425 to one or another of three change-over or conditioning positions, said valve being contained in a valve chamber 426 located between the pistons and constantly connected to a passage 147 leading from the emergency reservoir 3. This valve chamber is constantly connected to a control passage 427 leading to the seat for the control slide valve 410. The face of the piston 422 is provided with an annular seat rib 428 which is adapted to engage a gasket 429 which is clamped between the casing 402 and a cover plate 430, and the piston 423 is provided with an annular seat rib 431 which is adapted to engage a gasket 432 which is clamped between the casing 402 and the cover plate 415.

At the face side of the piston 422 there is a chamber 433 which is connected to a control passage 434 leading to the seat for the control slide valve 410. Contained in the piston chamber 433 is a movable stop member 436 which is adapted to engage the piston and which is subject to the action of a spring 437 interposed between and engaging the stop member and a plug 438 having screw-threaded connection with the cover plate 430. The spring 437 acts to move the stop member 436 in the direction toward the piston 422, movement of the member in this direction being adapted to be limited by the engagement of an annular flange 439 on the member with the cover plate 430.

At the face side of the piston 423 there is a chamber 440 which is connected to a control passage 441 leading to the seat for the control slide valve 410. Contained in the piston chamber 440 is a stop member 443 which is adapted to engage the piston 423 and which is subject to the action of a spring 444 interposed between and engaging the stop member and a plug 445 having screw-threaded connection with the cover plate 415. The spring 444 acts to move the stop member 443 in the direction toward the piston 423, movement of the member in this direction being adapted to be limited by the engagement of an annular flange 446 on the member with the cover plate 415.

The valve seat, besides being provided with the emergency reservoir passage 147 is also provided with an emergency reservoir passage 33, an auxiliary reservoir charging passage 256, a quick service passage 289, a choked passage 356 which is adapted to control the rate of flow of fluid between the auxiliary and emergency reservoirs, a choked passage 264 which is also adapted to control the rate of flow of fluid between the auxiliary and emergency reservoirs, the flow area of the passage 264 being greater than that of the passage 356 so as to permit a sufficiently rapid flow of fluid from the emergency reservoir to the valve chamber of the equalizing valve device to insure the prompt movement of the equalizing valve device in graduating the release of the brakes, a release passage 271 leading from the seat for the equalizing main slide valve, a release passage 273 leading to the atmosphere by way of the retaining valve device 19, a release passage 354 leading from the seat for the equalizing main slide valve, an application passage 122, an application and release passage 226 and an application and release passage 189 connected through pipe 188 to the volume reservoir 8 and piston chamber of the relay valve device 7. It will be understood that the passages just enumerated correspond with the passages in the rotary valve seat of the change-over valve device disclosed in the aforementioned pending application, Serial No. 743,546, and are indicated by reference characters which correspond with the reference characters used in the pending application. It will be noted that while the passages correspond with the passages shown in the pending application their arrangement has been changed in the present application in order to simplify the showing of the change-over slide valve 425 in its several conditioning positions.

*Control of the change-over valve device*

In the present embodiment of the invention the operation of the change-over valve device to condition the equipment for either passenger, express or freight train service depends upon the pressure of fluid in the signal pipe 401, so that the signal pipe pressure will be different for each class of train service, for instance, in passenger train service the signal pipe will be charged with fluid at the usual pressure of about forty-five pounds, in express train service it will be charged to a pressure higher than forty-five pounds, say for instance, to ninety pounds, and in freight train service will be at atmospheric pressure.

*Operation of change-over valve device to condition the fluid pressure brake equipment for passenger train service*

When a car equipped with a fluid pressure brake equipment embodying the invention is in passenger train service, fluid at signal pipe pressure supplied from the signal pipe 401 by way of pipe 406 to the diaphragm chamber 405 of the control valve mechanism of the change-over valve device, causes the flexible diaphragm 404 to flex inwardly, i. e., in a direction toward the right hand, shifting the stem 409 and associated control slide valve 410 in the same direction, such movement being yieldably opposed by the pressure of the spring 414, which pressure is transmitted to the stem 409 through the medium of the member 413. The movement of the stem 409 and control slide valve 410 continues until the stop member 413 is engaged by the stop member 417 when the spring 418, acting through the medium of the stop members 417 and 413, brings the stem and slide valve to a stop in the position in which they are shown in Fig. 2.

It will here be understood that when the stop member 413 and consequently the stem 409 and slide valve 410 are stopped as just described, these parts will be maintained in the position in which they are shown, by the action of the springs 414 and 418, against the normal signal pipe pressure of forty-five pounds applied to one side of the flexible diaphragm 404.

With the control slide valve 410 thus positioned, a cavity 447 therein connects the control passages 434, 441, and 427 together, consequently fluid under pressure supplied from the emergency reservoir through passage 147 to the change-over slide valve chamber 426 flows to the piston chambers 433 and 440, and since the fluid pressures on opposite sides are permitted to equalize, the spring urged stops 436 and 443 will act to maintain the change-over pistons 422 and 423 and slide valve 425 in the position for conditioning the equipment for passenger train service.

With the change-over slide valve in the position in which it is shown in Fig. 2 the equipment will be conditioned for passenger train service. In this position a cavity 448 in the slide valve connects the passages 189 and 226, a cavity 449 connects the passages 122 and 289, a cavity 450 connects the passages 273 and 271, a cavity 451 connects the passages 33 and 256, a port 452 leading from the valve chamber 426 registers with the passage 264 and a branch 453 of the port 452 registers with the passage 340 and further the change-over slide valve laps the passages 356 and 354. It will be understood that the communications established by the change-over slide valve 425 are the same as those established by the rotary valve of the change-over valve device disclosed in the aforementioned pending application, so that the fluid pressure brake equipment is now in condition for passenger train service. The equipment when thus conditioned will function to control the brakes in the same manner as described in said pending application.

It will be noted that with the control slide valve 410 in position for passenger train service, the passage 510 and consequently the chamber 509 are open to the control valve chamber 407 past the end of the slide valve, so that the chamber 509 is at atmospheric pressure. Thus the diaphragm 508 and lever 500 are rendered ineffective to control the operation of the control valve portion.

*Operation of change-over valve device to condition the fluid pressure brake equipment for express train service*

When the car is employed in express train service, the signal pipe pressure, being higher than forty-five pounds, causes the flexible diaphragm 404 to operate to shift the stem 409 and control slide valve 410 to their innermost position as shown in Fig. 3, compressing first the spring 414 and then the spring 417. As the slide valve 410 is being moved beyond the position it assumes in passenger service, it uncovers the passage 434, so that fluid under pressure is now vented from the piston chamber 433, through said passage, the control slide valve chamber 407 and passage 408, to the atmosphere. As the slide valve 410 is thus being moved and as long as it is maintained in this position by fluid at signal pipe pressure, the cavity 447 connects the passages 427 and 441 together, so that the piston chamber 440 is maintained charged with fluid at emergency reservoir pressure.

Leading from the cavity 447 to the sliding face of the control slide valve 410 is a passage or port 513 which, with said valve in position for express train service, registers with the passage 510 leading to the diaphragm chamber 509, so that fluid under pressure flows from the cavity 447 to the diaphragm chamber 509. Fluid under pressure thus supplied to the chamber 509 causes the diaphragm 508 to flex and move the follower member 507 in a direction toward the left hand into holding engagement with the end of the arm 505 of the lever 500 as shown in Fig. 3 of the drawings, the lever having been moved to this position by the member 417.

The pressure of fluid in chamber 509 acting through the medium of the flexible diaphragm 508, follower member 507 and lever 500 is sufficient to maintain the member 417 positioned against the pressure of the compressed spring 418. It will thus be seen that when the control valve portion is positioned for express train service, the spring 417 is rendered ineffective to move the stem 409 and control slide valve 410 from the position to which they have been moved.

When, however, the signal pipe pressure has been reduced below ten pounds, as will be the case when the signal pipe is opened to the atmosphere preparatory to the transfer of a car carrying the equipment from express train service to any other train service, the compressed spring 414 acting through the medium of member 413 causes the piston stem 409 and thereby the control slide valve 410 to make their full traverse in a direction toward the left hand. As the slide valve is being thus moved it first cuts off the communication between the port 513 and passage 510, and then, just as it moves to its passenger service position it uncovers the passage 510 to the valve chamber 407, so that fluid under pressure is vented from the chamber 509 through passage 510, valve chamber 407 and passage 408 to the atmosphere. With the chamber 509 thus vented, the arm 505 of the lever 500 is relieved of the holding pressure so that the spring acts to return the member 417 and thereby the lever 500 and follower member 507 to their normal position where they are effective to again control the positioning of the control valve portion.

With the control slide valve 410 in position for express train service and the piston chamber 433 vented to the atmosphere as hereinbefore described, fluid at emergency reservoir pressure in the piston chamber 440 and acting on the face of the piston 423 causes the piston assembly, which includes the pistons 422 and 423, piston stem 424 and change-over slide valve 425, to shift in a direction toward the left hand to its extreme position against the opposing pressure of spring 437, as shown in Fig. 3, in which position, the annular seat rib on the piston 422 engages the gasket 429 and forms a seal adapted to prevent leakage of fluid from the emergency reservoir to the atmosphere in case there is leakage from the valve chamber 426 past the piston 422.

With the change-over valve thus positioned, the cavity 448 therein maintains the passages 189 and 226 connected together, a cavity 454 connects the passages 271 and 354 together and a port 455 leading from the valve chamber 426 registers with the passage 356, all of the other passages with the exception of the emergency reservoir passage 147 being lapped. The communications thus established by the change-over slide valve are the same as those established by the rotary valve of the change-over valve device disclosed in the aforementioned pending application, so that the fluid pressure brake equipment is now in condition for express train operation, and when thus conditioned will function to control the brakes in the same manner as described in said pending application.

*Operation of the change-over valve device to condition the fluid pressure brake equipment for freight train service*

In cars equipped especially for freight train service the signal pipe is omitted, so that when a car equipped with a fluid pressure brake equipment embodying the invention is employed in freight train service, the signal pipe 401 will be open to the atmosphere through the usual coupling hose at each end of the car, consequently the signal pipe and connected diaphragm chamber 405 will be at atmospheric pressure.

With the diaphragm chamber 405 at atmospheric pressure, the spring 414 acting through the medium of the stop member 413 maintains the stem 409 and control slide valve 410 in their extreme outer position, as shown in Fig. 4, in which position the diaphragm 404 may engage a stop lug 456 on the cover plate 430.

With the control slide valve 410 thus positioned, the control passage 441 and consequently the piston chamber 440 are connected to the atmosphere by way of a port 514 in the valve 410, valve chamber 407 and passage 408. Further, with the slide valve in this position the cavity 447 therein connects the passages 427 and 434 so that fluid at emergency reservoir pressure in the change-over slide valve chamber 426 is supplied to the piston chamber 433, causing the piston assembly, which comprises the pistons 422 and 423, piston stem 424 and change-over slide valve 425, to shift in a direction toward the right hand against the resistance offered by the spring 444 acting through the medium of the stop 443, as shown in Fig. 4, in which position the seat rib 431 on the piston 423 engages the gasket 432 to form an air tight seal for preventing leakage of fluid from the emergency reservoir to the atmosphere in case there is leakage from the valve chamber 426 past the piston 423.

With the change-over slide valve 425 thus positioned, the cavity 454 connects the passages 271 and 354 together and the port 452 registers with the passage 356, all of the other passages, with the exception of the emergency reservoir passage 147 are lapped. The communications thus established by the change-over slide valve are the same as those established by the rotary valve of the change-over valve device disclosed in the aforementioned pending application, so that the fluid pressure brake equipment is now conditioned for freight train service, and when so conditioned will function to control the brakes in the same manner as described in said pending application.

With the control slide valve 410 in position for freight train service, the passage 510 and consequently the diaphragm chamber 509 are open to the control slide valve chamber 407, past the end of the slide valve, so that the chamber 509 is at atmospheric pressure. Thus the diaphragm 508 and lever 500 are rendered ineffective to control the operation of the control valve portion.

*Operations of the change-over valve device other than those hereinbefore described*

When a car equipped with the invention is removed from either a passenger train or an express train, the spring 414 acts to move the stem 409, control slide valve 410 and flexible diaphragm 404 in the direction toward the left hand to their extreme outer position. With the control slide valve in this position and the emergency reservoir charged, the change-over piston will be caused to make its full traverse in the direction toward the right hand as shown in Fig. 4. Now when the car is placed in a train to be used in any of the three classes of service hereinbefore mentioned, the control valve mechanism will cause the change-over valve mechanism to assume its proper conditioning position for the service in which the equipment is employed, all of which will be readily understood from the foregoing description of the several operations of the change-over valve device.

When the equipment is completely depleted of fluid pressure, as may be the case when a car has not been in use for some time, the spring 444, due to the emergency reservoir and consequently the change-over slide valve chamber 426 and piston chamber 433 being at substantially atmospheric pressure, will cause the change-over valve mechanism to move to the position in which it is shown in Fig. 2. From the foregoing description it will be seen that when the equipment is placed in a train and charged with fluid under pressure, the several parts of the change-over valve device will be caused to assume their proper position for the service in which the train is employed.

While one illustrative embodiment of the invention has been described in detail, it is not my intention to limit its scope to that embodiment or otherwise than by the scope of the appended claims.

Having now described my invention, what I claim as new and desire to secure by Letters Patent, is:

1. In a fluid pressure brake equipment, in combination, a change-over valve mechanism having a plurality of change-over positions and being operative by fluid under pressure within a certain range of pressures to one of the change-over positions, means for loading the mechanism in said position to prevent the mechanism from moving to another of the change-over positions unless the pressure of fluid for actuating the mechanism is in excess of the maximum pressure of said range of pressures, and means operative to relieve the mechanism of the load imposed thereon by the first mentioned means when the mechanism is moved to said other change-over position.

2. In a fluid pressure brake equipment, in combination, a change-over valve mechanism having a plurality of change-over positions and being operative by fluid under pressure within a certain range of pressures to one of the change-over positions, means for loading the mechanism in said position to prevent the mechanism from moving to another of the change-over positions unless the pressure of fluid for actuating the mechanism is in excess of the maximum pressure of said range of pressures, and means controlled by the mechanism to operate, when the mechanism is moved to said other change-over position, to relieve the mechanism of the load imposed thereon by the first mentioned means.

3. In a fluid pressure brake equipment, in combination, a change-over valve mechanism having a plurality of change-over positions and being operative by fluid under pressure within a certain range of pressures to one of the change-over positions, means for loading the mechanism in said position to prevent the mechanism from moving to another of the change-over positions unless the pressure of fluid for actuating the mechanism is in excess of the maximum pressure of said range of pressures, and fluid pressure responsive means operative, when the mechanism is moved to said other change-over position, to relieve the mechanism of the load imposed thereon by the first mentioned means.

4. In a fluid pressure brake equipment, in combination, a change-over valve mechanism having a plurality of change-over positions and being operative by fluid under pressure within a certain range of pressures to one of the change-over positions, means for loading the mechanism in said position to prevent the mechanism from moving to another of the change-over positions unless the pressure of fluid for actuating the mechanism is in excess of the maximum pressure of said range of pressures, means operative by fluid under pressure to relieve the mechanism of the load imposed thereon by the first mentioned means, and means included in the mechanism for supplying fluid under pressure in said other change-over position to effect the operation of the second mentioned means.

5. In a fluid pressure brake equipment, in combination, a change-over valve mechanism having a plurality of change-over positions and being operative by fluid under pressure within a certain range of pressures to one of the change-over positions, means for loading the mechanism in said position to prevent the mechanism from moving to another of the change-over positions unless the pressure of fluid for actuating the mechanism is in excess of the maximum pressure of said range of pressures, a lever operatively connected with said means, and means operative, when the mechanism is in said other change-over position, into engagement with said lever to relieve the mechanism of the load imposed thereon by the first mentioned means.

6. In a fluid pressure brake equipment, in combination, a change-over valve mechanism having a plurality of change-over positions and being operative by fluid under pressure within a certain range of pressures to one of the change-over positions, means for loading the mechanism in said position to prevent the mechanism from moving to another of the change-over positions, when the pressure of fluid for actuating the mechanism does not exceed the maximum pressure of said range of pressures, and for yieldably opposing movement of the mechanism to said other change-over position when the pressure of fluid for actuating the mechanism exceeds said maximum pressure, and means operative upon movement of the mechanism to said other change-over position for rendering the first mentioned means ineffective to move the mechanism out of said other position.

7. In a fluid pressure brake equipment, in combination, a change-over valve mechanism having a plurality of change-over positions and being operative by fluid under pressure within a certain range of pressures to one of the change-over positions, means for loading the mechanism in said position to prevent the mechanism from moving to another of the change-over positions unless the pressure of fluid for actuating the mechanism is in excess of the maximum pressure of said range of pressures, means operative to relieve the mechanism of the load imposed thereon by the first mentioned means when the mechanism is moved to said other change-over position, and means operative when the pressure for actuating the mechanism is less than the minimum pressure of said range of pressures for moving the mechanism to a third change-over position.

8. In a fluid pressure brake equipment, in combination, a change-over valve mechanism having a plurality of change-over positions and being operative by fluid under pressure within a certain range of pressures to one of the change-over positions, means for loading the mechanism in said position to prevent the mechanism from moving to another of the change-over positions unless the pressure of fluid for actuating the mechanism is in excess of the maximum pressure of said range of pressures, means operative to relieve the mechanism of the load imposed thereon by the first mentioned means when the mechanism is moved to said other change-over position, means operative when the pressure for actuating the mechanism is less than the minimum pressure of said range of pressures for moving the mechanism to a third change-over position, and means operative when the mechanism is returned from said other change-over position at least to the first mentioned change-over position to effect the operation of the second mentioned means to permit the return of the first mentioned means to its loading position.

9. In a fluid pressure brake equipment, in combination, a change-over valve mechanism having a plurality of change-over positions and being operative by fluid under pressure within a certain range of pressures to one of the change-over positions, a spring for yieldably opposing movement of the mechanism to said change-over position, a stop means normally positioned to stop the movement of the mechanism in said change-over position when the pressure of fluid for actuating the mechanism is within said range of pressures, said stop means being adapted to yieldably oppose the movement of the mechanism from said change-over position to another change-over position when the pressure of fluid for actuating the mechanism is in excess of the maximum pressure of said range of pressures, and means operative, when the mechanism is in said other change-over position, to relieve the mechanism of the pressure of said stop means.

10. In a fluid pressure brake equipment, in combination, a change-over valve mechanism having a plurality of change-over positions and being operative by fluid under pressure within a certain range of pressures to one of the change-over positions, a spring for yieldably opposing movement of the mechanism to said change-over position, a stop means normally positioned to stop the movement of the mechanism in said change-over position when the pressure of fluid for actuating the mechanism is within said range of pressures, said stop means being adapted to yieldably oppose the movement of the mechanism from said change-over position to another change-over position when the pressure of fluid for actuating the mechanism is in excess of the maximum pressure of said range of pressures, and means operative by fluid under pressure upon movement of the mechanism to said other change-over position for relieving the mechanism of the pressure of said stop means.

11. In a fluid pressure brake equipment, in combination, a change-over valve mechanism having a plurality of change-over positions and being operative by fluid under pressure within a certain range of pressures to one of the change-over positions, a spring for yieldably opposing movement of the mechanism to said change-over position, a stop means normally positioned to stop the movement of the mechanism in said change-over position when the pressure of fluid for actuating the mechanism is within said range of pressures, said stop means being adapted to yieldably oppose the movement of the mechanism from said change-over position to another change-over position when the pressure of fluid for actuating the mechanism is in excess of the maximum pressure of said range of pressures, and means operative upon movement of the mechanism to said other change-over position for preventing said stop means from moving the mechanism from said other change-over position.

12. In a fluid pressure brake equipment, in combination, a change-over valve mechanism having a plurality of change-over positions and being operative by fluid under pressure within a certain range of pressures to one of the change-over positions, a spring for yieldably opposing movement of the mechanism to said change-over position, a stop means normally positioned to stop the movement of the mechanism in said change-over position when the pressure of fluid for actuating the mechanism is within said range of pressures, said stop means being adapted to yieldably oppose the movement of the mechanism from said change-over position to another change-over position when the pressure of fluid for actuating the mechanism is in excess of the maximum pressure of said range of pressures, and means operative upon movement of the mechanism to said other change-over position for preventing said stop means from moving the mechanism from said other change-over position, said spring being adapted to move the mechanism to a third change-over position from either of the other two change-over positions when the pressure of fluid for actuating the mechanism is less than the minimum pressure of said range of pressures.

13. In combination with a fluid pressure brake equipment adapted to be conditioned to function for different classes of service, a change-over valve device having a chamber carrying fluid at a different pressure in each class of service, change-over valve means included in said device having positions for conditioning the fluid pressure equipment for said classes of service and being operative by fluid under pressure, a control valve mechanism included in said device operative by fluid at a certain pressure in said chamber to a position to effect the operation of the change-over valve means to one of its conditioning positions and operative by fluid at a pressure higher than said certain pressure to another position to effect the operation of the change-over valve means to another of its conditioning positions, spring means yieldably opposing movement of said control valve mechanism to its first mentioned conditioning position, additional spring means adapted to stop the control valve mechanism in its first mentioned conditioning position and yieldably opposing movement of the control valve mechanism to its second mentioned position, and means operative when the control valve mechanism is in its second mentioned position to relieve the control valve mechanism of the pressure of said additional spring means.

14. In combination with a fluid pressure brake equipment adapted to be conditioned to function for different classes of service, a change-over valve device having a chamber carrying fluid at a different pressure in each class of service, change-over valve means included in said device having positions for conditioning the fluid pressure equipment for said classes of service and being operative by fluid under pressure, a control valve mechanism included in said device operative by fluid at a certain pressure in said chamber to a position to effect the operation of the change-over valve means to one of its conditioning positions and operative by fluid at a pressure higher than said certain pressure to another position to effect the operation of the change-over valve means to another of its conditioning positions, spring means yieldably opposing movement of said control valve mechanism to its first mentioned conditioning position, additional spring means adapted to stop the control valve mechanism in its first mentioned conditioning position and yieldably opposing movement of the control valve mechanism to its second mentioned position, and operative by fluid under pressure upon movement of the control valve mechanism to its second mentioned position to relieve the control valve mechanism of the load imposed thereon by the additional spring means.

15. In combination with a fluid pressure brake equipment adapted to be conditioned to function for different classes of service, a change-over valve device having a chamber carrying fluid at a different pressure in each class of service, change-over valve means included in said device having positions for conditioning the fluid pressure equipment for said classes of service and being operative by fluid under pressure, a control valve mechanism included in said device operative by fluid at a certain pressure in said chamber to a position to effect the operation of the change-over valve means to one of its conditioning positions and operative by fluid at a pressure higher than said certain pressure to another position to effect the operation of the change-over valve means to another of its conditioning positions, spring means yieldably opposing movement of said control valve mechanism to its first mentioned conditioning position, additional spring means adapted to stop the control valve mechanism in its first mentioned conditioning position and yieldably opposing movement of the control valve mechanism to its second mentioned position, and operative by fluid under pressure supplied by the control valve mechanism upon its movement to its second mentioned position to relieve the control valve mechanism of the load imposed thereon by the additional spring means.

16. In combination with a fluid pressure brake equipment adapted to be conditioned to function for different classes of service, a change-over valve device having a chamber carrying fluid at a different pressure in each class of service, change-over valve means included in said device having positions for conditioning the fluid pressure equipment for said classes of service and being operative by fluid under pressure, a control valve mechanism included in said device operative by fluid at a certain pressure in said chamber to a position to effect the operation of the change-over valve means to one of its conditioning positions and operative by fluid at a pressure higher than said certain pressure to another position to effect the operation of the change-over valve means to another of its conditioning positions, and operative to another position when the pressure of fluid in said chamber is lower than said certain pressure to effect the operation of the change-over valve means to another of its conditioning positions, spring means yieldably opposing movement of the control valve mechanism to its first mentioned position, additional spring means for stopping said control valve mechanism in its first mentioned position and for yieldably opposing movement of the control valve mechanism to its second mentioned position, and means operative upon movement of the control valve mechanism to its second mentioned position for relieving the control valve mechanism of the load imposed thereon by said additional spring means, the first mentioned spring means being adapted to move the control valve mechanism to its third mentioned position when the pressure of fluid in said chamber is less than the pressure of said spring means.

17. In a fluid pressure brake equipment, in combination, a change-over valve mechanism having a plurality of change-over positions and movable by an increase in fluid pressure to a predetermined degree to one of said positions, means for yieldably resisting movement of the mechanism to said position and means for reducing the resisting force of the first mentioned means as the mechanism is being moved to said position for conditioning said mechanism so that movement from said position will take place only upon a reduction in fluid pressure to a degree substantially below said predetermined pressure.

18. In a fluid pressure brake equipment, in combination, a change-over valve mechanism comprising a yielding resistance means, a second yielding resistance means, valve means, a movable abutment operative to move said valve means to a change-over position upon an increase in fluid pressure slightly in excess of the pressure exerted by both yielding resistance means, and means operative upon movement to said position for relieving said abutment of the pressure of said second yielding resistance means, to prevent movement from said position until the fluid pressure on said abutment has been reduced to a degree less than the pressure exerted by the first yielding resistance means.

19. In a fluid pressure brake equipment, in combination, a change-over valve mechanism comprising valve means, a movable abutment operated by fluid under pressure for moving said valve means to a change-over position, yielding resistance means for opposing movement of said abutment by fluid under pressure, and means operative upon movement of said abutment by fluid under pressure for reducing the pressure exerted on said abutment by said yielding resistance means.

20. In a fluid pressure brake equipment, in combination, a change-over valve mechanism comprising valve means, a movable abutment operated by fluid under pressure for moving said valve means to a change-over position, yielding resistance means for opposing movement of said abutment by fluid under pressure, and means operative by fluid under pressure upon movement of said abutment by fluid under pressure for reducing the pressure exerted on said abutment by said yielding resistance means.

21. In a fluid pressure brake equipment, in combination, a change-over valve mechanism comprising valve means, a movable abutment operated by fluid under pressure for moving said valve means to a change-over position, yielding resistance means for opposing movement of said abutment by fluid under pressure, and means operative by fluid under pressure supplied by said valve means upon movement of said abutment by fluid under pressure for reducing the pressure exerted on said abutment by said yielding resistance means.

22. In a fluid pressure brake equipment, in combination, a change-over valve mechanism comprising a yielding resistance means, a second yielding resistance means, valve means, a movable abutment operative to move said valve means to a change-over position upon an increase in fluid pressure slightly in excess of the pressure exerted by both yielding resistance means, and means operative upon movement to said position for relieving said abutment of the pressure of said second yielding resistance means, the first mentioned yielding resistance means being adapted to move said valve means to another change-over position when the pressure of fluid on said abutment is less than the opposing pressure of the first mentioned yielding resistance means.

23. In a fluid pressure brake equipment, in combination, a change-over valve mechanism comprising a yielding resistance means, a second yielding resistance means, valve means, a movable abutment operative to move said valve means to a change-over position upon an increase in fluid pressure slightly in excess of the pressure exerted by the first mentioned yielding resistance means and operative to move said valve means to another change-over position upon an increase in fluid pressure slightly in excess of the pressure exerted by both yielding resistance means, and means operative upon movement of said valve means to the second mentioned change-over position for relieving the abutment of the pressure of the second mentioned yielding resistance means, the first mentioned yielding resistance means being adapted to move said valve means from either one of said change-over positions to a third change-over position when the pressure of fluid acting on said abutment is reduced to a degree less than the pressure exerted by the first mentioned yielding resistance means.

24. In a fluid pressure brake equipment, in combination, a change-over valve mechanism comprising a yielding resistance means, a second yielding resistance means, valve means, a movable abutment operative to move said valve means to a change-over position upon an increase in fluid pressure slightly in excess of the pressure exerted by the first mentioned yielding resistance means and operative to move said valve means to another change-over position upon an increase in fluid pressure slightly in excess of the pressure exerted by both yielding resistance means, means operative upon movement of said valve means to the second mentioned change-over position for relieving the abutment of the pressure of the second mentioned yielding resistance means, the first mentioned yielding resistance means being adapted to move said valve means from either one of said change-over positions to a third change-over position when the pressure of fluid acting on said abutment is reduced to a degree less than the pressure exerted by the first mentioned yielding resistance means, and means operative upon movement of the valve means by the first mentioned yielding resistance means from the second mentioned change-over position for effecting the operation of the first mentioned means to permit the return of the second mentioned yielding resistance means to its resisting position.

CLYDE C. FARMER.